United States Patent

[11] 3,585,532

| [72] | Inventors | Norman A. Ruggles<br>Pasadena;<br>Irving I. Kaplan, Baltimore, both of, Md. |
|---|---|---|
| [21] | Appl. No. | 765,059 |
| [22] | Filed | Oct. 4, 1968 |
| [45] | Patented | June 15, 1971 |
| [73] | Assignee | Westinghouse Electric Corporation<br>Pittsburgh, Pa. |

[54] CONTIGUOUS FILTER BANK USING SHARED RESONATORS
10 Claims, 7 Drawing Figs.

[52] U.S. Cl. .................................................. 333/7,
328/105, 179/15, 325/468
[51] Int. Cl. ...................................................... H01p 5/12
[50] Field of Search .......................................... 325/363,
468; 324/77 E, 80; 333/72, 7, 78, 6; 334/12;
336/229; 343/105

[56] References Cited
UNITED STATES PATENTS

| 3,181,149 | 4/1965 | Wienberg et al. | 336/229 |
| 3,180,445 | 4/1965 | Schwartz et al. | 324/77 |
| 3,167,738 | 1/1965 | Westerfield | 324/77 |
| 3,345,572 | 10/1967 | Kaplan et al. | 343/105 |
| 3,374,448 | 3/1968 | Hurtig | 333/72 |
| 3,461,407 | 8/1969 | Ruggles et al. | 333/6 |

*Primary Examiner*—Robert L. Richardson
*Assistant Examiner*—Anthony H. Handal
*Attorneys*—F. H. Henson, E. P. Klipfel and J. L. Wiegreffe

ABSTRACT: An improvement in a frequency detection channel utilized in spectrum analyzers for such apparatus, as, for example, pulse doppler radar systems. The frequency detection channel is comprised of a passive circuit including a shared resonator band-pass filter, which is adapted to provide coherent integration, coupled to a square loop core which is adapted to provide envelope detection and postdetection integration.

PATENTED JUN15 1971 3,585,532

WITNESSES
Theodore F. Wrobel
James F. Young

INVENTORS
Norman A. Ruggles
and Irving I. Kaplan
BY John L. Wiegroffe
ATTORNEY

CONTIGUOUS FILTER BANK USING SHARED RESONATORS

CROSS-REFERENCE TO RELATED APPLICATIONS

The present invention is related to applicants'U.S. Pat. No. 3,461,407 entitled "Contiguous Filter Bank Using Shared Resonators" issued on Aug. 12, 1969. Said Patent moreover is assigned to the assignee of the present invention.

BACKGROUND OF THE INVENTION

The invention herein described was made in the course of or under a contract or subcontract thereunder with the Department of the Navy, Bureau of Naval Weapons.

This invention is directed to an improved circuit which forms a portion of a signal translation system for retrieving information signal data dispersed in a wide spectrum of signal frequencies including noise frequencies and other frequencies of random phase and amplitude. Although not limited thereto, the circuit comprising the subject invention is particularly adapted to be used in connection with a system for retrieving pulse doppler radar signal data from the doppler echo spectrum of a radar receiver and has for its purpose increasing the signal noise ratio of the signal data.

Furthermore, it is well known that in such systems the process of detecting signals in random noise, such as introduced by all practical antennas and receivers, is materially enhanced by reducing the bandwidth through which the received target signal plus noise, passes before a detection decision is made. It has been found that a doppler frequency shift of a radar echo signal is measurable to a satisfactory degree of resolution by using a large number of contiguous channels of selected bandwidth which collectively cover the band of frequencies having information-bearing significance. In effect, the continuum of frequency is quantized such that the bandwidth of one of the frequency channels becomes one quantum. The center frequency of the entire channel filter bank then labels the center of the doppler shifted frequency signal power spectrum. This frequency channeling coincides with the bandwidth reduction made necessary or desirable by the requirements of signal detection. Accordingly, the present state of the art doppler radar apparatus employs a receiver which includes a multichannel system in which the doppler frequency resolution is carried out by a bank of contiguous frequency filters. To examine the output of the filter bank channel means are also included which perform the functions of predetection integration, demodulation of the envelope, postdetection integration and storage. Sequential interrogation of each of the aforesaid means takes place and the output thereof is fed to data processing means which makes use of the detection decisions which are binary two state "yes or no" in nature and according to predetermined logic arranges the received information into sets describing a particular target. The signal data information in the power spectrum output of the individual channels may moreover be handled by conventional digital data handling equipment of conventional design.

Apparatus of the type described above is further disclosed in U.S. Pat. No. 3,181,149 granted to Norman L. Weinberg and Ralph J. Metz as well as U.S. Pat. No. 3,345,572 granted to Irving I. Kaplan and Joseph G. Fay. The first patent discloses a system having a plurality of contiguous filter circuits coupled to respective magnetic cores having a plurality of reversible stable magnetic states between two stable saturation limits in a special circuit configuration which permits the core to serve as a demodulator, integrator, storage and memory element. To provide the necessary isolation for the filter networks during the readout process, a transistor is utilized between the filter and the "integrate drive" winding of the magnetic core. The transistor in that instance serves both as an amplifier and as a means to decouple the integrate drive winding from the filter during the "readout" of the core. The second patent discloses an improvement in such circuits wherein the heretofore required transistor is eliminated. By properly biasing the square loop magnetic core at a selected threshold level, it may be operated as a current-driven device so that the integrate drive winding can be connected directly to the output of a channel filter which has an extremely low output impedance at the carrier frequency. Under this condition the core can perform envelope detection, that is, demodulation of the envelope and postdetection integration and serve also as a switch mechanism in an interrogate matrix when the interrogate pulse is of a selected frequency and width so that substantially all of the energy of the pulse transformed by the core is well outside the band pass of the channel filter. Also each band pass filter is comprised of a two-pole filter preferably of the crystal type of conventional construction and which exhibits a very high Q. The magnetic core moreover is capable of assuming a plurality of stable magnetic states between two stable saturation limits.

While the noted prior art apparatus provides significant advances in the art, it should be pointed out that for $n$ channels, the prior art apparatus as disclosed in U.S. Pat. No. 3,345,572 requires the use of $2n$ crystal resonators, $2n$ resistors, $2n$ coupling elements, and $n$ square loop storage integrator cores.

In the aforementioned copending related application a means for reducing the number of components required in a contiguous band pass filter bank is disclosed. Said application makes use of the principle of shared resonators between adjacent band pass filters thereby reducing the number of resonators in a bank of $n$ filters from $2n$ resonators to only $n+1$ resonators. Additionally, the resonators are respectively coupled to one of the primary windings of the transformer for the adjacent channels so that the total current in each resonator is shared magnetomotively in adjacent channels.

SUMMARY OF THE INVENTION

The present invention is an improvement in the noted prior art and is directed to a frequency detection channel employing the concepts of the multifunction capabilities of the square loop core integrator as well as the principles of shared resonator band pass filter design to reduce the number of components required for $n$ frequency detection channels to $n+1$ resonators, $n+1$ resistors and $n$ square loop storage integrator cores. Each frequency detection channel comprises a band pass filter coupled to a square loop storage integrator core including a pair of input or integrate drive windings, a bias and interrogate winding, and an output or sense winding and wherein the band pass filter of one frequency detection channel is coupled to one of the pair of integrate drive windings in a predetermined polarity sense. The band pass filter of an adjacent frequency detection channel however is coupled to the other integrate drive winding in the opposite polarity sense. The square loop storage core then shares the band pass filters of adjacent channels. Moreover, a plurality of frequency detection channels are contiguously coupled together by means of the integrate drive windings of the respective square loop integrator cores so that sharing of band pass filters of adjacent channels is achieved throughout the array and wherein all of the output windings of the square loop cores are coupled together to provide an output to predetermined data processing means as each of the bias and interrogator windings are consecutively interrogated. Each of the band pass filters is preferably comprised of a crystal resonator coupled to one input winding of a shared square loop core with an adjacent crystal resonator being coupled to the other input winding in an opposite polarity sense from the former thereby providing a shared resonator filter.

DESCRIPTION OF THE PREFERRED EMBODIMENT

Figure 1:
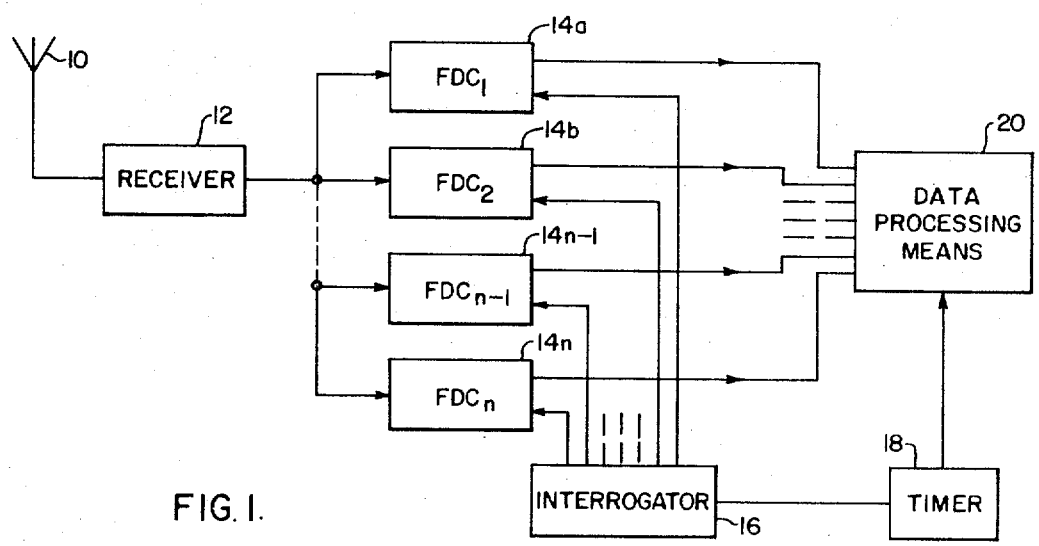
FIG. 1 is a schematic block diagram of a plurality of frequency detection channels coupled to a receiver and operated in accordance with a pulse doppler radar system.

The environment for the preferred embodiment of the present invention is illustrated in FIG. 1 in connection with a signal translation system for retrieving information signal data dispersed in a wide spectrum of signal frequencies. Such a system may be, for example, a pulse doppler radar system wherein a receiving antenna 10 is coupled to a range gated receiver 12 which is responsive to doppler shifted echo signals. The output of the receiver 12 is coupled to a plurality of contiguous frequency detection channels 14a—14n each of which quantizes discrete portions of the doppler echo spectrum. All of the frequency detection channels 14a—14n are consecutively interrogated at predetermined intervals by means of an interrogator unit 16 which is controlled or synchronized by a timer circuit 18. The respective outputs of the frequency detection channels 14a—14n are coupled to suitable data processing means 20 which is also synchronized by the timer 18. The data processing means 20 may be any conventional data processing unit and its peripheral apparatus for handling pulse doppler information.

Figure 2:
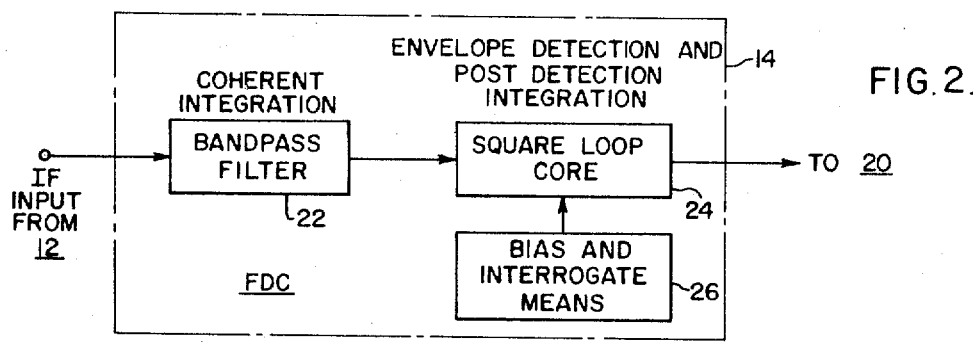
FIG. 2 is a block diagram of one of the plurality of frequency detection channels.
Figure 3:
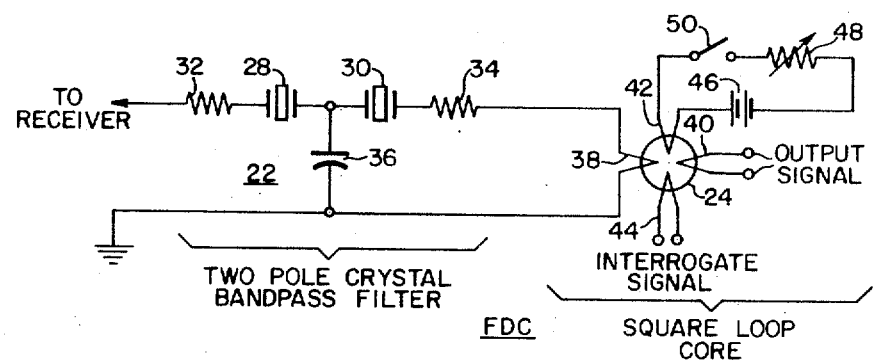
FIG. 3 is an electrical schematic diagram of one embodiment of a frequency detection channel which constitutes known prior art.
Figure 6:
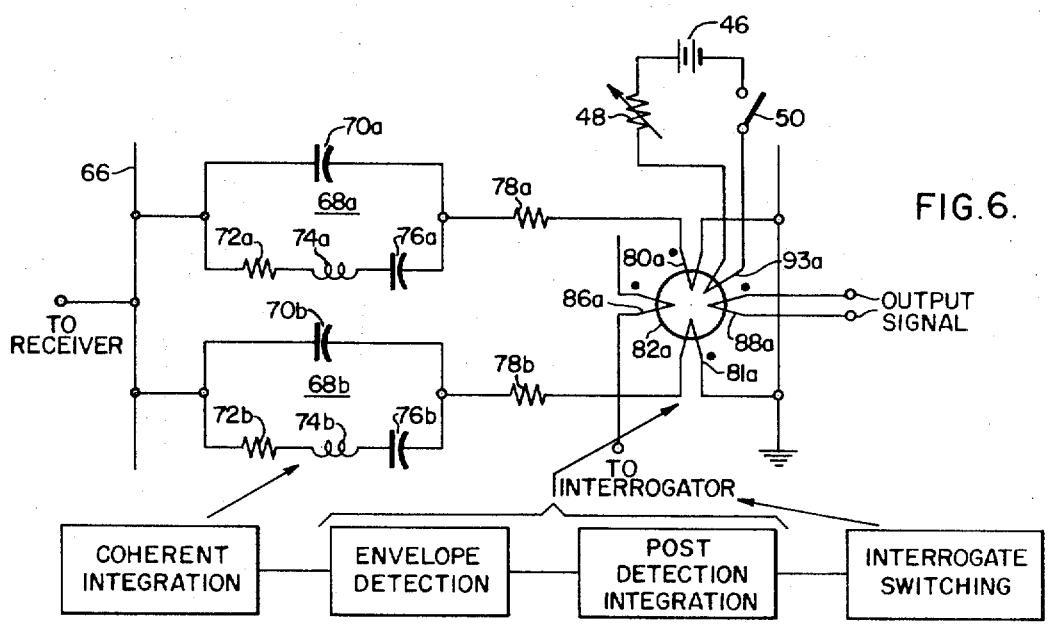
FIG. 6 is a schematic diagram partly illustrative of the preferred embodiment of the subject invention.

Since all of the filter detection channels 14a—14n are identical, except for their band pass characteristics, it is necessary only to illustrate one of these channels in detail which is disclosed in block diagrammatic form in FIG. 2 and schematically at FIGS. 3 and 6. FIG. 3 moreover discloses a frequency detection channel of the known prior art whereas FIG. 6 discloses a frequency detection channel according to the teachings of the present invention.

Figure 4:
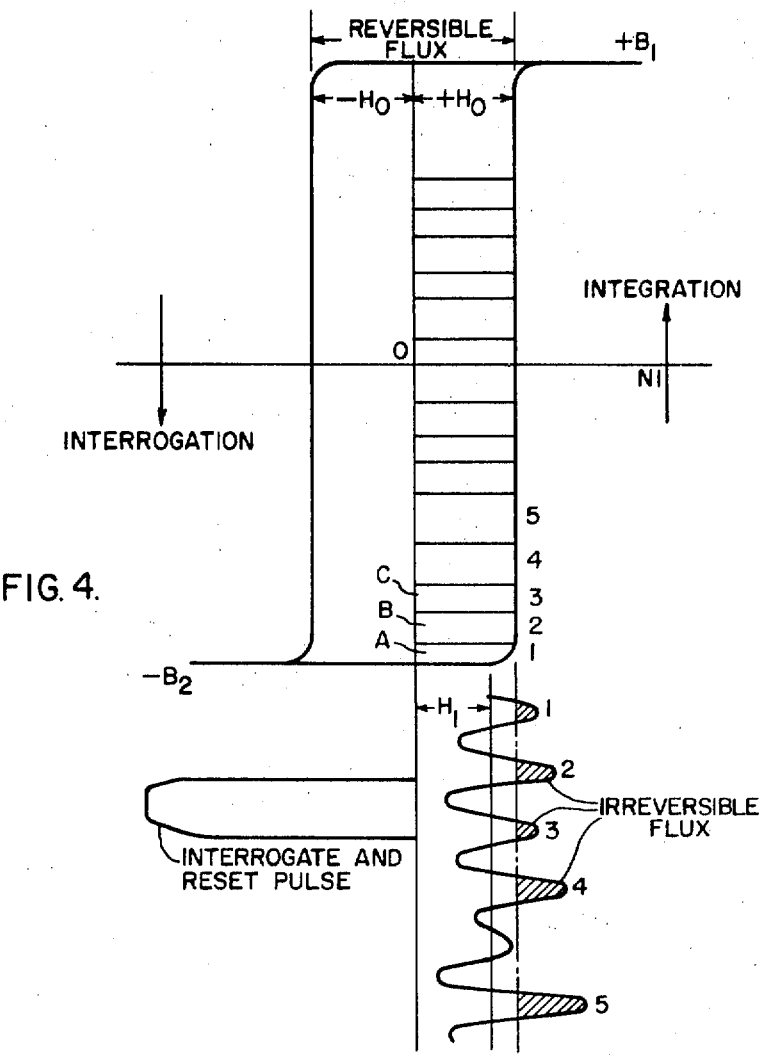
FIG. 4 is a diagram illustrating the magnetizing characteristics of a square loop magnetic core and the manner in which the core functions in the circuit configurations in accordance with the present invention.

Referring now to FIG. 2, the frequency detection channel 14 is comprised of a band pass frequency filter 22 which is coupled to the receiver 12 shown in FIG. 1 and receives an IF signal input therefrom. The band pass filter 22 is coupled to a magnetic core 24 which is capable of assuming a plurality of stable magnetic states between two saturation limits. This core 24 has a square loop hysteresis characteristic exhibited by a magnetic core material which may be, for example, of the type conventionally referred to as Hipernik V. The flux current loop together with its method of operation is illustrated in FIG. 4 and will be discussed hereinafter. The band pass filter 22 functionally performs a coherent integration of the signal applied thereto while the square loop magnetic core 24 is adapted to functionally provide envelope detection and post detection integration by means of the bias and interrogate means 26 coupled thereto in accordance with the teachings of the above-cited U.S. Pat. No. 3,345,572. Moreover, such a teaching is illustrated in FIG. 3 and comprises a band pass filter 22 comprised of a pair of crystal resonators 28 and 30, two isolation resistors 32 and 34, and a coupling element 36 which is illustrated as a capacitor. When desirable, however, the coupling element 36 may be an inductance or even a transformer. The configuration shown embodies a two-pole crystal band pass filter having a predetermined band pass frequency characteristic. It is directly coupled to an input winding 38 which is referred to hereinafter as the "integrate drive winding" wound on the core 24. Three additional windings 40, 42, and 44 are also wound on the core and constitute an output or "sense winding," a readout or "interrogate drive winding" and a "bias drive winding," respectively. The interrogate drive and bias drive windings 44 and 42, respectively, are included, inter alia, in the bias and interrogate means 26 shown in FIG. 2. The interrogate drive winding 44 is adapted to be coupled to the interrogator unit 16 shown in FIG. 1 while the bias drive winding 42 is adapted to be coupled to a variable DC bias source including the DC source 46, a variable resistance 48, and a switch 50.

The filter 22 quantizes the incoming doppler frequency signals as to bandwidth, while combination of the bias drive winding 42 energized from the DC source 46 which applies a unidirectional flux threshold to the core 24 and the interrogate drive winding 44 constitutes a demodulator of the power spectrum envelope and at the same time integrates it and stores it during the time interval between interrogation pulses which are supplied to the interrogate drive winding 44 to readout the flux stored in the core on the sense winding 40 as a representation of the signal power spectrum of the particular channel.

To facilitate the understanding of the role of the core 24 in the present invention it is appropriate to briefly review the theory of magnetism as it relates to the present apparatus to see how it functions both as a demodulator of the doppler frequency envelope as well as an integrator and memory device. The square loop magnetic core 24 used in this invention operates as a current-driven device. Therefore, the core does not function as a Faraday's law integrator since the input signal is current rather than a voltage source. However, for a limited range of drive current amplitudes, current integration can be approximated by the mathematical expression, $$\Delta\Phi = K \int (H - H_o) dt$$

where $H$ is the applied magnetizing force which is proportional to the integrate drive current times the number of turns and where $H_o$ is the internal threshold field within the core required for irreversible magnetization. The core 24 functions as an ampere-second accumulator. Although the practical use of square loop cores, such as core 24, in this manner depends upon the control of measured properties and considerable care in combination with empirical judgment in the unit selection, it is helpful to attempt to visualize the flux change process in terms of the domain theory.

A simplification of the nature of the accumulative integrator core may be considered as an idealized single crystal of ferromagnetic material having a geometry providing a two-domain configuration. The magnetization within these two domains is antiparallel, creating a 180° domain wall. Since it has been previously shown that the velocity at which such a domain wall moves is proportional to the effective field perpendicular to the domain wall, it follows that the growth of one domain at the expense of the other is evidenced by a consequent change in flux. Also for appropriate geometries which is possessed by integrator cores, such as the core 24, the flux change is also proportional to the displacement of the wall. As a result, it will be apparent that such a device lends itself readily to being an integrator since the movement of the domain wall is the time interval of a voltage appearing in a sense winding. The displacement of the domain wall is proportional to the time integral of the effective $H$ field which is proportional to the magnetizing field. In the configuration shown in FIG. 3, the magnetizing field is that due to the current output from the filter 22. Therefore, the effective field which moves the domain wall and represents stored flux is that applied to the integrate drive winding 38 minus any bias flux $H_1$ indicated in FIG. 4.

Referring now to FIG. 4 there is a representation of the rectangular B-H magnetization curve for square loop material of the type of which cores 24 are made where the two magnetization saturation limits $+B_1$ and $-B_2$ indicates the limits of magnetization of the core 24 within which a plurality of stable magnetic states exists. The flux between these two limits $-H_0$ and $+H_0$ is reversible by applying an external field while any flux outside of the limits will add to or subtract from the integrated flux inside the core. The bias voltage from the DC source 46 applied to the bias winding 42 maintains a constant unidirectional internal threshold represented at $H_1$ or any other desired level. It will be seen that any alternating magnetomotive force in the integrate drive winding 38 which has a magnitude greater than the coersive force threshold $H_0$ will cause the domain walls inside of the core to move toward the upper limit $B_1$ saturation and the amount that it moves in that direction will be an integral of ampere-seconds supplied to the integrate drive winding 38. These ampere-seconds are represented by the areas A, B, C, etc. indicated in FIG. 4. It will be apparent that as the amplitude of the integrate drive current produces a magnetizing force greater than the coercive force level $+H_0$, it will be added to the core by the positive loop but that the negative loop will not have any effect since it does not move in the opposite direction into the opposite coercive force region beyond the level $-H_0$. Accordingly, the curve serves as a demodulator as well as an integrator. During the interrogation or readout process, the flux is reversed by an interrogate current pulse of sufficient amplitude and duration so that it drives the magnetic core into its reset or zero position $-B_2$.

It should be observed that the fabrication of a plurality of contiguous frequency detection channels as disclosed by the prior art circuit in FIG. 3 requires $n$ cores, $2n$ frequency resonator crystals, $2n$ resistors and $n$ coupling elements for $n$ channels. Since a multichannel system may require a great multitude of cores and associated filter components, any reduction in the number of elements required for fabrication would be highly desirable. It is to this end that the present invention is directed. Before proceeding to a contemplated embodiment, however, further discussion of pertinent prior art is necessary lest the scope of the present invention might be confused with that of the aforementioned related U.S. Pat. No. 3,461,407 and which is illustrated schematically at FIG. 5.

Figure 5:
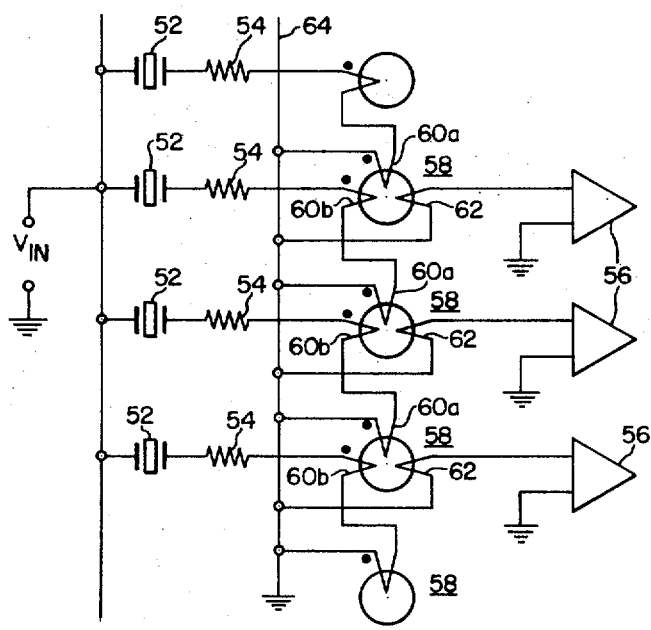
FIG. 5 is a schematic diagram of a contiguous filter bank using shared resonators and which also constitutes known prior art.

FIG. 5 discloses a contiguous filter bank using shared resonators. More particularly, there is disclosed a plurality of filter elements including crystal resonators 52 in combination with respective isolation resistors 54 coupled into virtual grounded input amplifiers 56 by means of toroidal transformers 58. The transformers include two primary windings 60a and 60b and one output winding 62. One side of the secondary winding 62 is connected to the input of the amplifiers 56 while the opposite end is returned to a ground buss 64. Each of the primary windings 60a is coupled to an adjacent resonator 52 through the adjacent transformer winding 60b. The primary windings 60a and 60b are oppositely poled with respect to its associated adjacent winding so as to provide the required phase reversal so that each resonator 52 has its total current shared magnetomotively in adjacent channels. At the same time, the isolating resistors 54 provide an essentially constant terminating impedance for the resonators 52. The term "filter" as used with respect to FIG. 5 includes the entire combination comprising crystal resonator 52, the resistor 54, the primary windings 60 of adjacent transformers, and the terminating impedance thereof as reflected in the secondary winding 62.

It is contemplated by the present invention to utilize the concept of shared resonators in a bank of contiguous filters in combination with the multifunction capability of a square loop core so that a simplified embodiment of a frequency detection channel requiring $n+1$ resonators, $n+1$ resistors, and $n$ square loop cores are required for $n$ frequency detection channels. To this end, attention is directed to FIG. 6 wherein a schematic drawing of a single frequency detection channel is shown wherein frequency selective elements of adjacent channels are shared by square loop magnetic cores. Shown in FIG. 6 is an input buss 66 which is coupled back to a receiver, not shown, but which may be for example the receiver 12 shown in FIG. 1. Coupled to the input buss 66 is a plurality of frequency selective elements 68a and 68b including the electrical components of a capacitor 70a in parallel with a series configuration including the resistor 72a, the inductance 74a, and the capacitor 76a. This R-C-L combination is the equivalent electrical circuit for a crystal resonator such as shown in FIGS. 3 and 5. Frequency selective elements 68a and 68b are coupled through respective isolation resistors 78a and 78b to a pair of input or integrate drive windings 80a and 81a wound on a square loop core 82. Both of the integrate drive windings 80a and 81a are coupled to a ground buss 84. An interrogate winding 86a is wound on the core 82a and is adapted to be coupled to an interrogator unit, not shown. Additionally, a bias winding 93a is wound on the core and a variable DC bias potential is applied thereto by means of a DC battery 46, a variable resistance 48, and a switch 50. Finally, an output or sense winding 88a is wound on the core 82a and provides an output for the channel. What is significant is the fact that a single square loop core 82a is adapted to operate in combination with adjacent frequency selective elements 68a and 68b to functionally provide envelope detection and postdetection integration.

Figure 7:
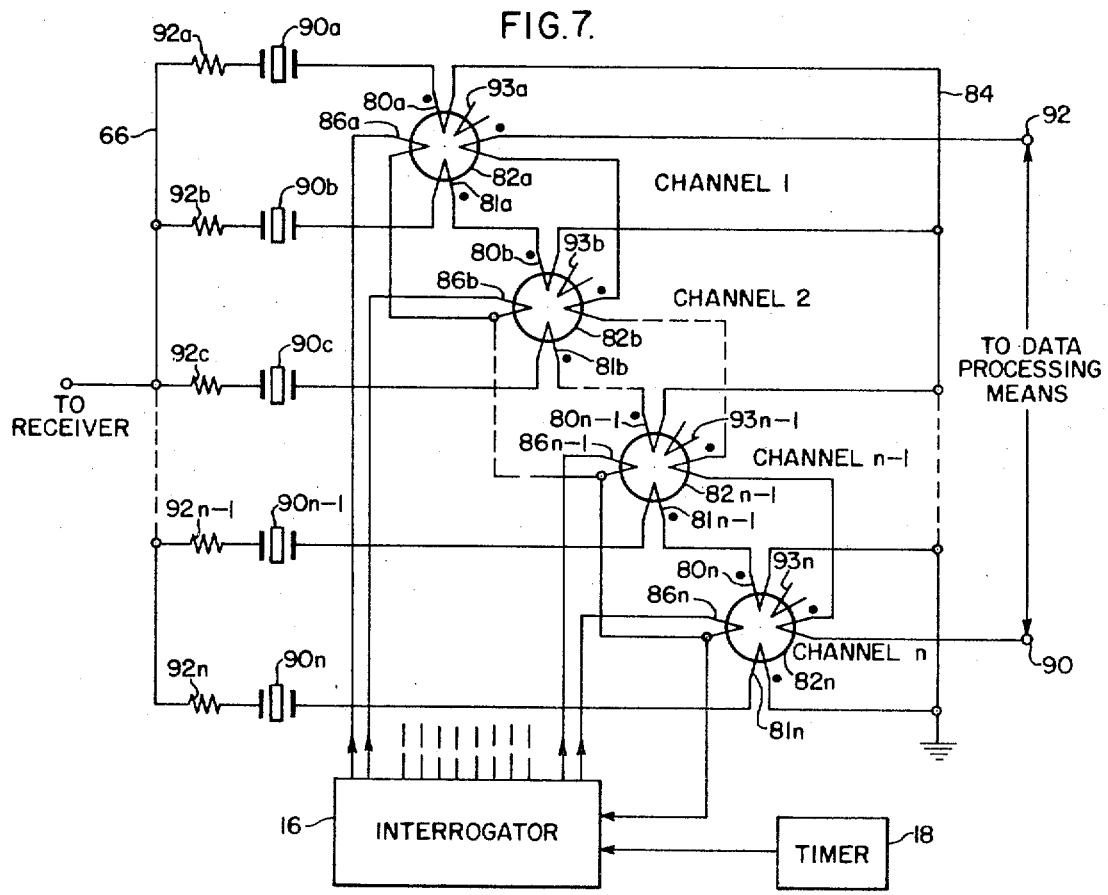
FIG. 7 is a schematic diagram of a plurality of contiguous frequency detection channels wherein each channel includes the preferred embodiment of the subject invention.

A further illustration of the invention concept of the present invention is shown in FIG. 7 wherein a plurality of $n$ frequency detection channels include square loop cores which share crystal resonators between adjacent channels. Considering now FIG. 7, a plurality of crystal resonators $90a-90n$ are respectively coupled to the square loop cores $82a-82n$. The crystal resonators $90a-90n$ are frequency selective elements as noted above and act in combination with the oppositely poled integrate drive winding of the adjacent channel to provide a net magnetomotive force to the core producing in effect a band pass filter thereby. Additionally, isolation resistors $92a-92n$ are coupled between the crystal resonators $90a-90n$ and the input buss 66 which is adapted to be coupled back to a receiver, not shown, but which may be for example receiver 12 in FIG. 1. The first crystal resonator 90a is coupled to its respective square loop core 82a by means of the integrate drive winding 80a. The second crystal frequency, however, is coupled not only to the square loop core 82a by means of the integrate drive winding 81a but is also coupled to the adjacent square loop 82b by means of integrate drive winding 80b which is coupled in series but oppositely poled from integrate drive winding 81a. It can be seen that this interconnection repeats itself up to the $n$th channel wherein the crystal resonator $90n-1$ is coupled to the square loop cores $82n-1$ and $82n$ by means of the integrate drive windings $81n-1$ and $80n$. The last crystal resonator $90n$ is merely coupled to the $n$th square loop core $82n$ by means of the integrate drive winding $81n$. All of the integrate drive windings are returned to the ground buss 84.

The interrogate drive and bias windings $86a-86n$ are coupled to an interrogator unit 16 wherein the retrieval process takes place in a synchronized arrangement for energizing the windings $86a-86n$ in the proper order and sequence to take advantage of the stored information represented by the accumulated magnetic states of the cores $82a-82n$. The desired signal data is stored in the cores in what is commonly referred to as "irreversible" flux during the integration process. However, as noted earlier, during the interrogation or readout process, this so-called irreversible flux is reversed by an interrogate pulse of sufficient power so that it drives the magnetic core into its reset or zero position. This is shown by reference to FIG. 4. During this retrieval of flux, by transformer action voltages will be developed not only in the instant sense winding 88 which is interrogated but in the other windings including the integrate drive windings. By suitably biasing the cores however, the integrate drive windings 80 and 81 are effectively decoupled from each other.

The sense windings $88a-88n$ are coupled together in series in an aiding polarity relationship to common output terminals 90 and 92 so that as each of the interrogate drive and bias windings $86a-86n$ are consecutively interrogated a respective output will appear for each of the channels 1 through $n$ in timed sequence at the terminals 90 and 92.

It can be seen that whereas $n$ frequency detection channels of the known prior art requires $2n$ resonators, $2n$ resistors, $2n$ coupling elements, and $n$ square loop cores, the present invention by use of the shared crystal resonator concept reduces the number of required components to $n+1$ resonators, $n+1$ resistors, and $n$ square loop cores.

Although the present invention has been shown and described with respect to an embodiment thereof which gives satisfactory results it should be understood that changes may be made and equivalents substituted without departing from the spirit and scope of the invention. For example, the interrogate windings when desirable may be interrogated either singly or in unison with the sense windings being individually coupled to respective output terminals and/or utilization means.

We claim as our invention:

1. A contiguous filter bank comprising a plurality of signal channels adapted to be connected to a source of a spectrum of frequencies including the desired signal power to be retrieved and wherein each of said signal channels have selected bandwidths with said plurality of signal channels being contiguous to embrace a desired band of frequencies having information-bearing significance, each frequency detection channel comprising in combination:

frequency selective means in each of said channels having predetermined frequency characteristics;

a magnetizable element having a plurality of stable magnetic states between the two saturation limits of opposite polarities;

first input means magnetically coupling said frequency selective means to said magnetizable element in a first polarity sense;

second input means magnetically coupling said frequency selective means of an adjacent channel to said magnetizable element in an opposite polarity sense with respect to said first input means providing a net magnetomotive force in one direction, said magnetizable element sharing the frequency selective means of next adjacent channels;

third means magnetically coupled to said magnetizable element for reversing the magnetization developed by said net magnetomotive force to the opposite saturation limit; and fourth means magnetically coupled to said magnetizable element for producing an electrical output signal proportional to the state of magnetization created by the reversal of said net magnetomotive force by said third means.

2. The invention as defined by claim 1 and additionally including fifth means coupled to said magnetizable element for applying a bias magnetizing force to said magnetizable element at a selective value less than the coercive force threshold of said element.

3. The invention as defined by claim 2 wherein said magnetizable element comprises a magnetic core having a square loop hysteresis characteristic.

4. The invention as defined by claim 3 wherein said first and second input means each comprises an integrate drive winding magnetically coupled to said magnetic core.

5. The invention as defined by claim 4 wherein said frequency selective means recited in claim 1, coupled to said first integrate drive winding and said second integrate drive winding, respectively, is comprised of a crystal resonator.

6. The invention as defined by claim 1 wherein said frequency selective means comprises a resonator element.

7. The invention as defined by claim 6 wherein said resonator element comprises a crystal filter resonator.

8. The invention as defined by claim 1 wherein said third means comprises an interrogate winding including means for reversing the magnetization of said core at predetermined times.

9. The invention as defined by claim 1 wherein said fourth means comprises a sense winding.

10. The invention as defined by claim 9 and wherein each sense winding of all said plurality of signal channels are coupled together in series aiding relationship for providing a common output, and whereby each interrogate winding is sequentially interrogated in timed relationship.